United States Patent [19]
Wakeland

[11] Patent Number: 6,101,192
[45] Date of Patent: Aug. 8, 2000

[54] NETWORK ROUTER WITH PARTITIONED MEMORY FOR OPTIMIZED DATA STORAGE AND RETRIEVAL

[75] Inventor: Carl K. Wakeland, Austin, Tex.

[73] Assignee: Advanced Micro Devices, Inc., Sunnyvale, Calif.

[21] Appl. No.: 08/842,989

[22] Filed: Apr. 25, 1997

[51] Int. Cl.[7] .................................................. H04L 12/54
[52] U.S. Cl. ........................................... 370/429; 370/401
[58] Field of Search .................................... 370/401, 402, 370/428, 429, 412, 371, 378

[56] References Cited

U.S. PATENT DOCUMENTS

| | | | |
|---|---|---|---|
| 5,014,268 | 5/1991 | Tyrrell et al. | 370/379 |
| 5,634,015 | 5/1997 | Chang et al. | 395/309 |
| 5,691,984 | 11/1997 | Gardner et al. | 370/401 |
| 5,802,047 | 9/1998 | Kinoshita | 370/359 |
| 5,805,589 | 9/1998 | Hochschild et al. | 370/389 |
| 5,852,605 | 12/1998 | Kim | 370/381 |

*Primary Examiner*—Huy D. Vu
*Assistant Examiner*—Dung Trinh
*Attorney, Agent, or Firm*—Kevin L. Daffer; Conley, Rose & Tayon

[57] ABSTRACT

A network router is presented for transferring data between multiple communication networks. The network router has a network interface unit (NIU) for each communication network the router is coupled to, and a single memory unit for storing the data. Each NIU is adapted for coupling to a network transmission medium of the corresponding communication network. A section of the memory unit (i.e., a memory partition) is allocated for each communication network (i.e., for each NIU). Each memory partition includes a memory subpartition allocated for each NIU. A receive unit within each NIU receives data from the corresponding network transmission medium and determines, using address information within the packetized data, which of the other NIUs should transmit the data (i.e., the destination NIU). The receive unit then stores the received data within the memory subpartition allocated to the destination NIU within the memory partition assigned to the receiving NIU. A transmit unit within each NIU periodically polls the memory subpartition allocated to the NIU within each memory partition for the presence of data to be transmitted. If such data is found, the transmit unit retrieves the data from the memory unit and transmits the data upon the network transmission medium of the corresponding communication network.

18 Claims, 9 Drawing Sheets

NETWORK ROUTER WITH PARTITIONED MEMORY FOR OPTIMIZED DATA STORAGE AND RETRIEVAL

BACKGROUND OF THE INVENTION

1. Field of the Invention

This invention relates to packet-switched data communication networks and more particularly to data routers employed within communication networks.

2. Description of the Relevant Art

Computer networks are communication networks which allow two or more computer systems to exchange data or share resources such as input/output (I/O) devices. There are two basic types of computer networks: local area networks (LANs) and wide area networks (WANs). A LAN is an interconnection of computer systems within a limited geographical area. A LAN may encompass a portion of a building, an entire building, or a cluster of buildings. A LAN allows users within the same office or company to exchange data files or share resources such as printers. A WAN connects computer systems over a large area, such as an entire city, state, or country. WANs are typically implemented using existing public switched telephone networks (PSTNs), and are thus operated and maintained by telephone service providers such as AT&T, MCI, and Sprint. A WAN allows users at remote sites, such as retail outlets, branch offices, or even their own homes, to exchange information with other users at a central corporate office or data site. The Internet, a complex interconnection of WANs, allows users to access information provided by companies and other users located worldwide.

Most modern communication networks are "packet-switched" networks. In a packet-switched network, multiple devices share the full data transmission capability of a single transmission medium. Network devices typically generate bursts of data followed by relatively long idle periods. Packet-switched communication networks handle the "bursty" nature of network device data traffic economically and efficiently by interleaving the data streams of many devices on the same transmission medium. Types of network transmission media include coaxial cable, twisted-pair cable, and even space (e.g., air or water) for "unguided" light or radio waves. Network devices typically exchange information via blocks of data called "packets". The packets are commonly encapsulated into "frames" transmitted sequentially over the transmission medium. Packets and frames are generated according to a selected set of rules or procedures governing the exchange of information (i.e., a selected network "protocol"). Address and control information within the packets are used to route the packets to their destination. Packet switching provides a way for network devices to share the full data transmission capability of the transmission medium without interference or interminable waiting periods for access.

There are numerous communication protocols currently being used in LANs and WANs to effectuate communication among network devices. Such protocols include TCP/IP, Ethernet, Frame Relay, DDS, ATM, X.25 and Sonet. Each communication protocol achieves data transmission in a different way. Unfortunately, network hardware and/or software designed to implement one communication protocol will typically not recognize data transmitted using another protocol. In addition, new communication protocols are continually being developed in an effort to increase the rates and reliabilities of data exchanges.

Special network devices called "routers" serve as links between communication networks. The router performs any required network protocol conversions. For example, assume a first device is coupled to a first network, a second device is coupled to a second network, and a router is coupled between the two networks. In order for the first device to send a message to the second device, the first device typically sends the message directly to the router which has an address just like any other network device. The message includes the address of the second device. The router extracts the data from the frames and packets of the protocol of the first network. Using the address of the second device within the message, the router determines that the data is to be forwarded to the second network. The router "packetizes" and "frames" the message data according to the protocol of the second network, then transmits the message to the second device via the network transmission medium of the second network.

Network routers temporarily store received data within one or more data buffers before retransmitting the data. When data cannot be routed quickly enough within a router, one or more of the data buffers may become full. Any data forwarded to a full data buffer is lost in a data buffer "overflow" condition. Such lost data must typically be retransmitted by the sender, causing transmission delays which negatively impact the data transmission rate. In addition, the need to retransmit data due to data losses within the router increases network data traffic.

It would be beneficial to have a network router architecture which efficiently forwards received data to the appropriate communication network. Reduced delays within the network router would help prevent data buffer overflow conditions and the resulting data losses and increased network data traffic.

SUMMARY OF THE INVENTION

The problems outlined above are in large part solved by a network router for transferring data between multiple communication networks. The network router has a network interface unit (NIU) for each communication network the router is coupled to, and a single memory unit for storing the data. Each NIU is adapted for coupling to a network transmission medium of the corresponding communication network. A section of the memory unit (i.e., a memory partition) is allocated for each communication network (i.e., for each NIU). Each memory partition includes a memory subpartition allocated for each NIU. A receive unit within each NIU receives data from the corresponding network transmission medium and determines, using address information within the packetized data, which of the other NIUs should transmit the data (i.e., the destination NIU). The receive unit then stores the received data within the memory subpartition allocated to the destination NIU within the memory partition assigned to the receiving NIU. A transmit unit within each NIU periodically polls the memory subpartition allocated to the NIU within each memory partition for the presence of data to be transmitted. If such data is found, the transmit unit retrieves the data from the memory unit and transmits the data upon the network transmission medium of the corresponding communication network.

In a preferred embodiment of the network router, the multiple NIUs are coupled to an NIU bus. The memory unit is coupled to the NIU bus through chip set logic which controls the storage and retrieval of data within the memory unit and arbitrates control of the NIU bus between the multiple NIUs. A central processing unit (CPU) is coupled to the chip set logic and is configured to execute instructions stored within the memory unit. The CPU initiates the activities of each of the NIUs, maintains and transfers data routing information to each of the NIUs, and gathers error information from each of the NIUs. The chip set logic additionally functions as an interface between the CPU and the memory unit and between the CPU and the NIU bus. Each NIU includes an internal bus, a bus interface unit, and a control unit in addition to the transmit unit and the receive unit. The bus interface unit is coupled between the NIU bus and the internal bus, and is configured to handle data transfers between the NIU and the memory unit. The transmit unit is coupled to the internal bus. The transmit unit periodically polls the memory subpartition allocated to the NIU within each memory partition for the presence of data to be transmitted as described above. If such data is found, the transmit unit retrieves the data, encapsulates the data into one or more frames according to a selected network protocol, converts the framed data to a serial data stream, and provides the resulting framed serial data stream to a medium attachment unit. The medium attachment unit is coupled to the transmit unit and adapted for coupling to the network transmission medium. The medium attachment unit receives the framed serial data stream from the transmit unit and transmits the framed serial data stream upon the network transmission medium. The medium attachment unit is also configured to receive a framed serial data stream from the network transmission medium and to provide the framed serial data stream to the receive unit. The receive unit is coupled between the medium attachment unit and the internal bus, and receives the framed serial data stream from the medium attachment unit. The receive unit extracts the data from the framed serial data stream according to the selected network protocol and converts the serial data to parallel form. Using routing information (i.e., a routing table) stored within a receive memory unit of the receive unit and address information present within the packetized data, the receive unit determines the destination NIU. The receive unit then stores the data within the memory subpartition allocated to the destination NIU within the memory partition assigned to the receiving NIU as described above. The control unit is coupled to the internal bus. The control unit initiates the activities of the bus interface unit, the transmit unit, and the receive unit, and arbitrates control of the internal bus between the transmit unit and the receive unit.

Each memory subpartition includes a transmit descriptor portion for storing information about the data and a data buffer portion for storing the data. The transmit descriptor portion includes multiple transmit descriptor buffers, and the data buffer portion includes multiple data buffers. Each transmit descriptor buffer is sized to contain a transmit descriptor which identifies the destination NIU and the address of the data buffer containing the data. There is preferably a one-to-one correspondence between the transmit descriptor buffers and the buffers. In this case, a given transmit descriptor describes the contents of a corresponding data buffer. In addition, each set of transmit descriptor buffers within each transmit descriptor portion of each memory subpartition is preferably managed as a circular queue wherein each transmit descriptor buffer is used in sequence from a "first" transmit descriptor buffer to a "last" transmit descriptor buffer. When the "last" transmit descriptor buffer is used, the "first" transmit descriptor buffer is reused.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
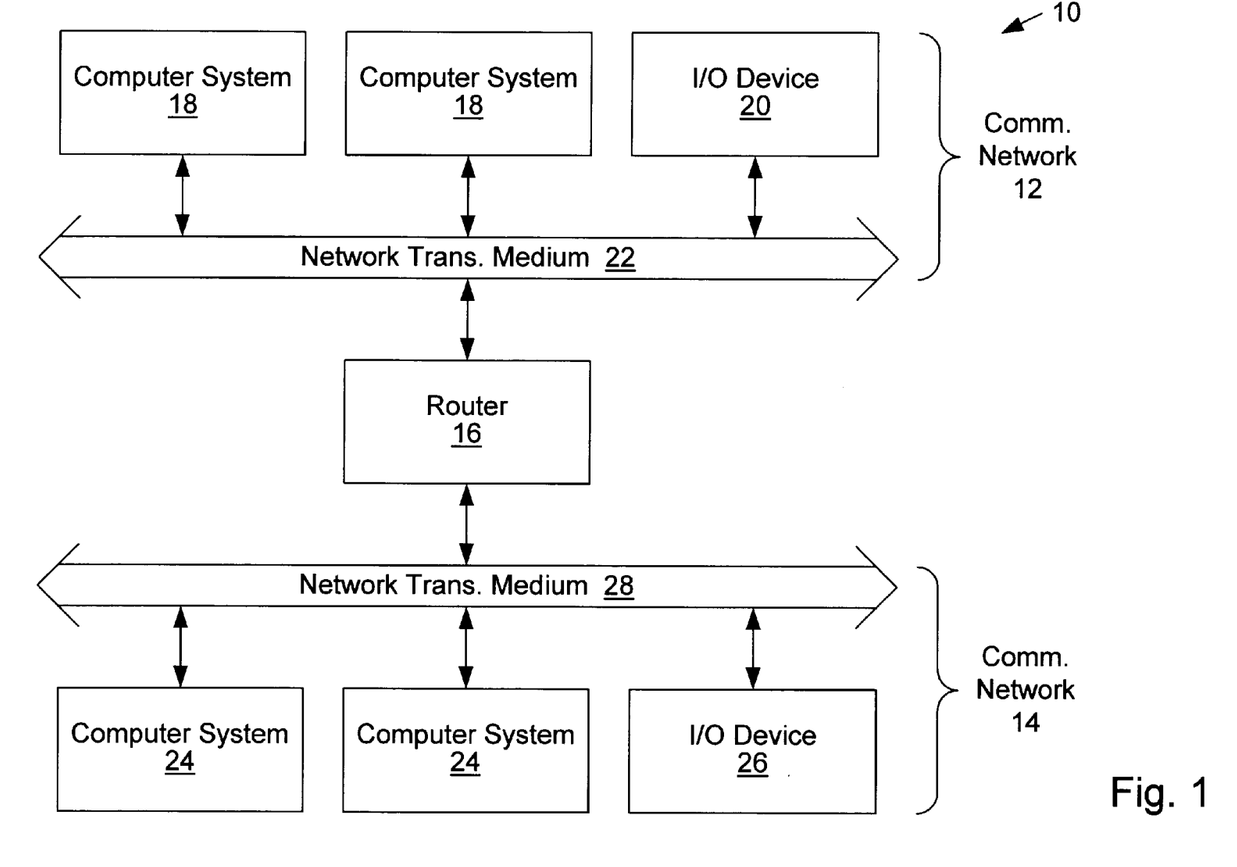
FIG. 1 is a block diagram of a communication system 10 including a network router which transfers data between multiple communication networks.

Referring now to FIG. 1, a communication system 10 which incorporates the preferred embodiments of the present invention is shown. Communication system 10 includes a first communication network 12 and a second communication system 14 interconnected by a network router 16. Communication network 12 includes two computer systems 18 and an I/O device 20 coupled to a network transmission medium 22. I/O device 15 may be, for example, a printer. Network transmission medium 22 interconnects computer systems 18 and I/O device 20, allowing computer systems 18 to exchange data and share I/O device 20. Communication network 14 includes two computer systems 24 and an I/O device 26 coupled to a network transmission medium 28. I/O device 26 may be, for example, a facsimile machine. Network transmission medium 28 interconnects computer systems 24 and I/O device 26, allowing computer systems 24 to exchange data and share I/O device 26.

Network transmission media 22 and 28 form a signal path between transmitting devices and receiving devices. Network transmission media 22 and 28 may guide electromagnetic waves (i.e., signals) along an enclosed path (e.g., coaxial cables, twisted-pair cables, or fiber-optic cables). Network media 22 and 28 may also be an ambient through which electromagnetic waves propagate between transmitting devices and receiving devices (e.g., air, water, or space).

Router 16 interconnects communication networks 12 and 14, reformatting data between the protocol used within communication network 12 and the protocol used within communication network 14. Router 16 allows computer systems 18 and 24 to exchange data and to share I/O devices 20 and 26.

Figure 2:
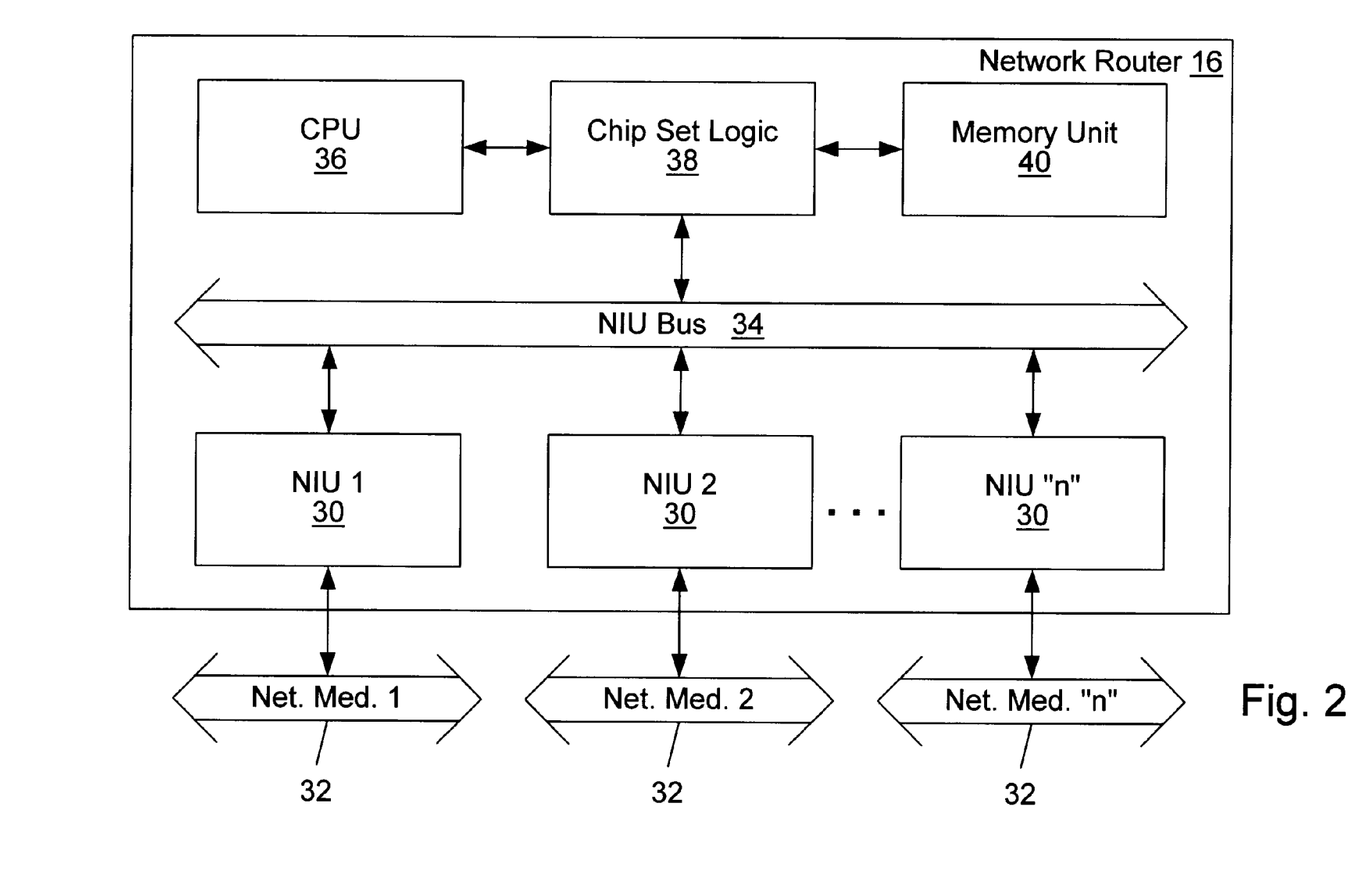
FIG. 2 is a block diagram of a preferred embodiment of the network router of FIG. 1, wherein the router includes a network interface unit (NIU) for each communication network the router is coupled to, and wherein the router includes a single memory unit for storing the data.

FIG. 2 is a block diagram of a preferred embodiment of network router 16 of FIG. 1. Network router 16 includes n network interface units (NIUs) 30, where n≧2. Each NIU 30 is adapted for coupling to a different network transmission medium 32. Each NIU 30 is coupled to an NIU bus 34. NIU bus 34 includes multiple signal lines for conveying signals. Router 16 also includes a central processing unit (CPU) 36 coupled to chip set logic 38. Chip set logic 38 is coupled to NIU bus 34 and a memory unit 40. Memory unit 40 serves as temporary storage for data received by NIUs 30, and also stores instructions and data required by CPU 36. Memory unit 40 preferably includes one or more semiconductor memory devices. Chip set logic 38 functions as an interface between CPU 36 and NIU bus 34, and between CPU 36 and memory unit 40. Chip set logic 38 preferably includes a memory controller to control the storage and retrieval of data within memory unit 40. Chip set logic 38 also preferably includes arbitration logic to arbitrate control of NIU bus 34 between CPU 36 and NIUs 30. CPU 36 executes instructions stored within memory unit 40 and initiates the activities of the NIUs 30. CPU 36 and NIUs 30 obtain data (i.e., read data) from memory unit 40 via chip set logic 38, and store data (i.e., write data) to memory unit 40 via chip set logic 38.

Each NIU 30 is configured to transmit and receive information (i.e., data) via a corresponding network transmission medium 32. Each NIU 30 operates in a transmit mode and a receive mode. In the transmit mode, an NIU 30 retrieves data from memory unit 40 via NIU bus 34 and transmits the data upon the corresponding network transmission medium 32 according to a selected communication protocol. In the receive mode, the NIU 30 receives data from corresponding network transmission medium 32 according to the selected communication protocol and stores the data within memory unit 40 via NIU bus 34.

Figure 3:
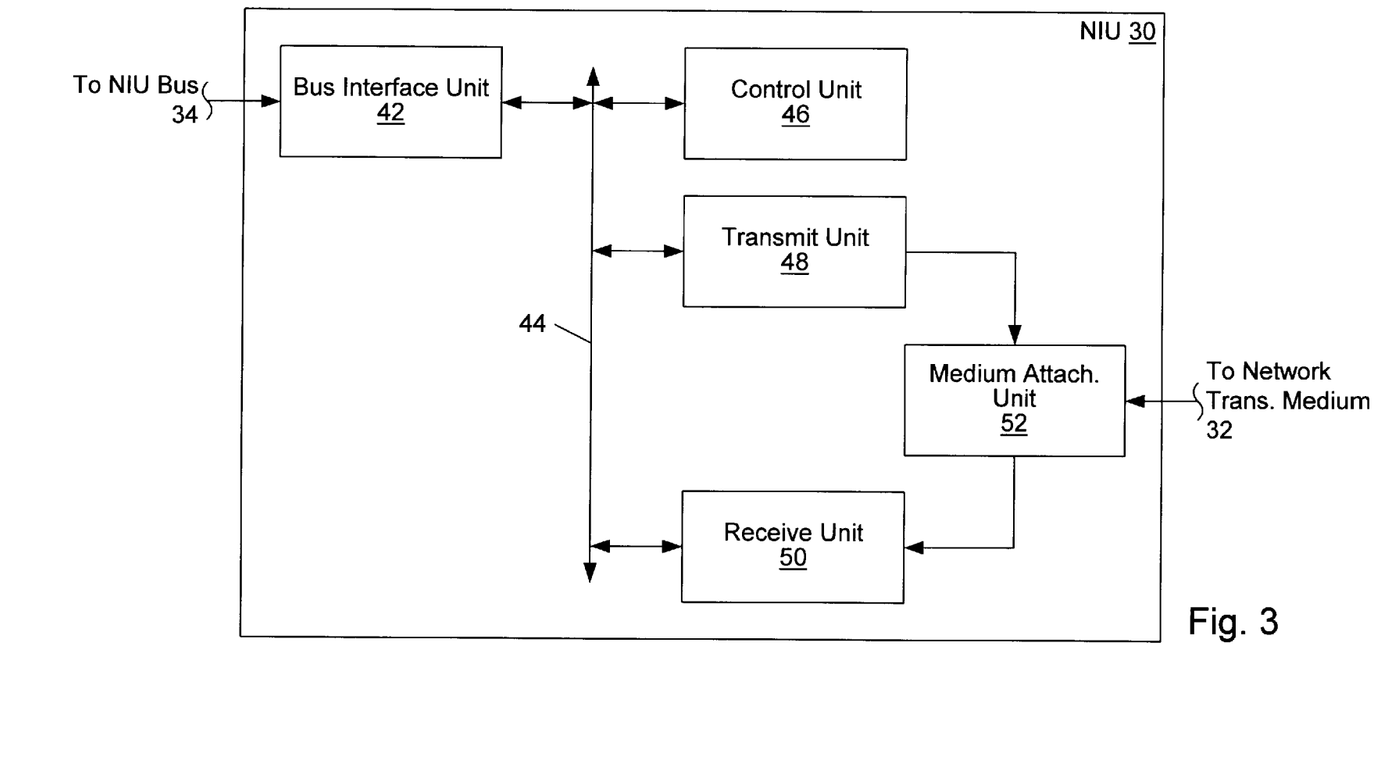
FIG. 3 is a block diagram of a preferred embodiment of each NIU of FIG. 2.

FIG. 3 is a block diagram of a preferred embodiment of each NIU 30 of FIG. 2. NIU 30 includes a bus interface unit 42, an internal bus 44, a control unit 46, a transmit unit 48, a receive unit 50, and a medium attachment unit 52. Internal bus 44 includes multiple signals lines for conveying signals. Control unit 46 is coupled to internal bus 44 and initiates the activities of bus interface unit 42, transmit unit 48, and receive unit 50. Control unit 46 also includes arbitration logic circuitry which arbitrates control of internal bus 44 between transmit unit 48 and receive unit 50. Bus interface unit 42 is coupled between NIU bus 34 and internal bus 44. NIU 30 stores data within and retrieves data from memory unit 40 via NIU bus 34, preferably using direct memory access (DMA). Bus interface unit 42 includes multiple data buffers and handles data transfers between NIU 30 and memory unit 40. Medium attachment unit (MAU) 52 is adapted for coupling to network transmission medium 32 and is configured to provide an electrical and mechanical interface to network transmission medium 32. MAU 52 includes transmission circuitry (i.e., a transmitter) for transmitting data upon network transmission medium 32. MAU 52 also includes receiver circuitry (i.e., a receiver) for receiving data from network transmission medium 32.

Transmit unit 48 is coupled between internal bus 44 and medium attachment unit 52. Transmit unit 48 polls memory unit 40 for packet data to be transmitted. Transmit unit 48 retrieves packet data to be transmitted from memory unit 40 via NIU bus 34 and internal bus 44. Transmit unit 48 receives the packet data in parallel units (i.e., a fixed number of consecutive bits transferred simultaneously). Transmit unit 48 encapsulates the parallel data into frames in accordance with a selected network protocol, converts the parallel data to a serial data stream, and provides the resulting framed serial data stream to MAU 52 for transmission upon network transmission medium 32.

Receive unit 50 is also coupled between internal bus 44 and medium attachment unit 52. MAU 52 provides a framed serial data stream received from network transmission unit 32 to receive unit 50. Receive unit 50 extracts the packet data from the framed serial data stream according to the selected network protocol and converts the packet data to parallel units. If the packet data includes an address assigned to NIU 30, receive unit 50 stores the packet data within memory unit 40 via NIU bus 34 and internal bus 44.

Figure 4:
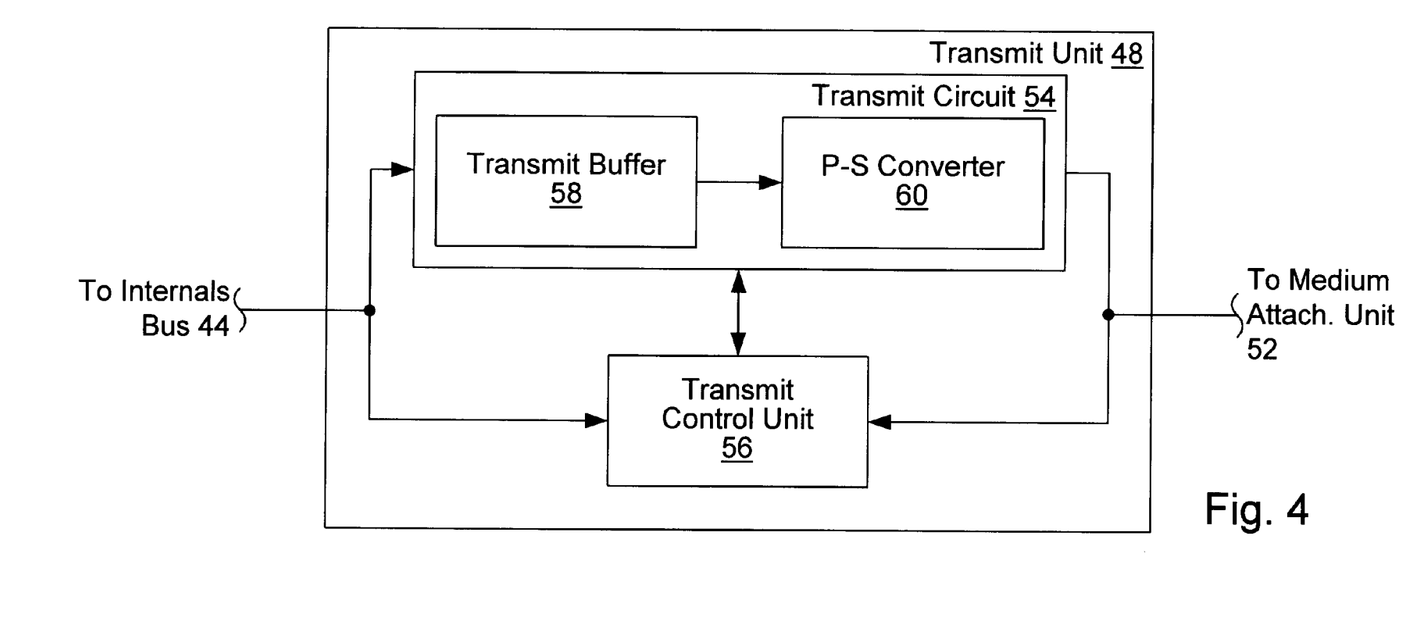
FIG. 4 is a block diagram of a preferred embodiment of a transmit unit of the NIU of FIG. 3.

FIG. 4 is a block diagram of a preferred embodiment of transmit unit 48. Transmit unit 48 includes a transmit circuit 54 and a transmit control unit 56. Transmit circuit 54 is coupled to internal bus 44, MAU 52, and transmit control unit 56. Transmit control unit 56 is coupled to internal bus 44 and MAU 52. Transmit control unit 56 controls the functions of transmit circuit 54. In response to control signals from transmit control unit 56, transmit circuit 54 receives packet data to be transmitted upon network transmission medium 32 in parallel units from internal bus 44, encapsulates the parallel data into frames in accordance with a selected network protocol, converts the parallel data to a serial data stream, and provides the resulting framed serial data stream to MAU 52 for transmission upon network transmission medium 32. Transmit circuit 54 includes a transmit buffer 58 for temporary storage of packet data. Transmit buffer 58 is preferably a first-in-first-out (FIFO) buffer. Transmit circuit 54 also includes a parallel-to-serial (PS) converter 60 for converting the parallel packet data to the serial data stream.

Figure 5:
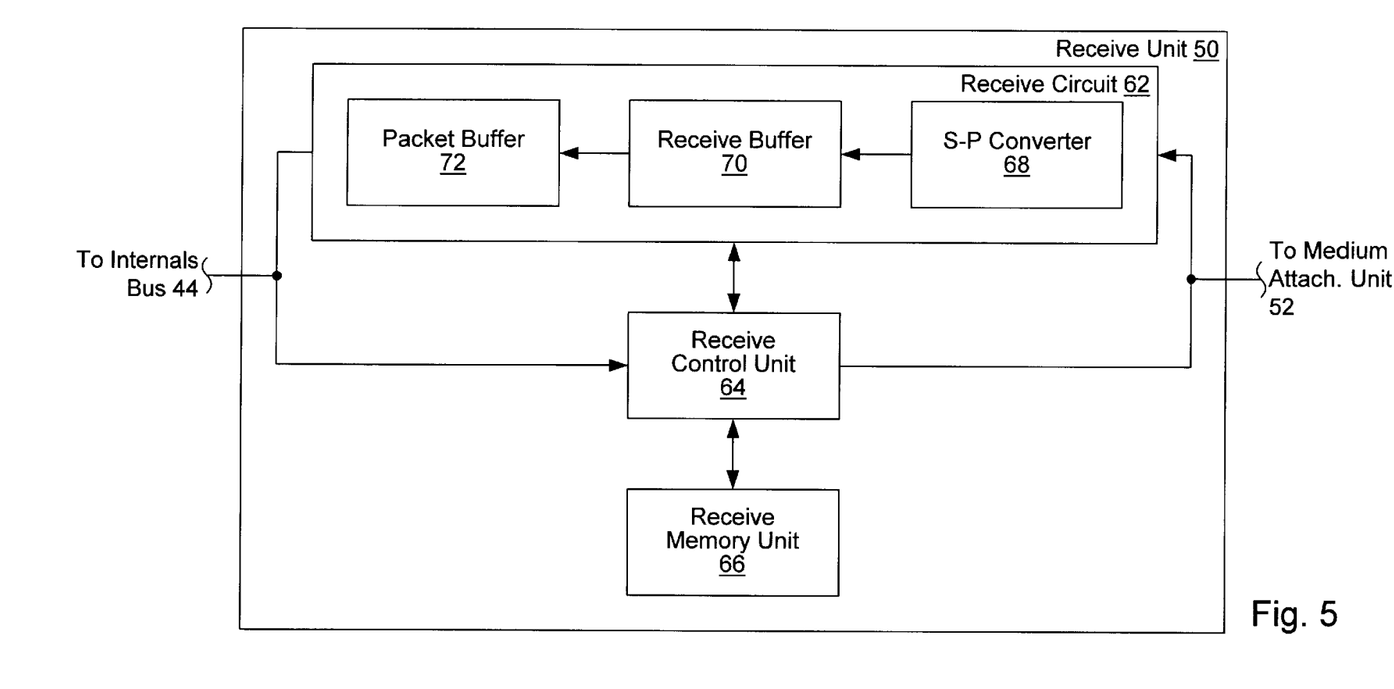
FIG. 5 is a block diagram of a preferred embodiment of a receive unit of the NIU of FIG. 3.

FIG. 5 is a block diagram of a preferred embodiment of receive unit 50. Receive unit 50 includes a receive circuit 62, a receive control unit 64, and a receive memory unit 66. Receive circuit 62 is coupled to internal bus 44, MAU 52, and receive control unit 64. Receive control unit 64 is coupled to internal bus 44, receive memory unit 66, and MAU 52. Receive control unit 64 controls the functions of receive circuit 62. Receive memory unit 66 stores packet routing information (i.e., a routing table) used by receive control unit 64 to forward received packet data to the appropriate NIU 30. MAU 52 provides a framed serial data stream received from network transmission unit 32 to receive circuit 62. As will be described in more detail below, receive circuit 62 generates a transmit descriptor including the identity of the destination NIU and the address of a section of memory unit 40 where the corresponding packet data will be stored. Receive circuit 62 then conveys the transmit descriptor to bus interface unit 42 via internal bus 44. Bus interface unit 42 stores the transmit descriptor within memory unit 40 via NIU bus 34. Receive circuit 62 extracts the packet data from the framed serial data stream, converts the packet data to parallel units, and conveys the parallel packet data units to bus interface unit 42 via internal bus 44. Bus interface unit 42 stores the packet data within memory unit 40 at the address in the transmit descriptor via NIU bus 34.

Receive circuit 62 includes a serial-to-parallel (S-P) converter 68, a receive buffer 70, and a packet buffer 72. S-P converter 68 converts the framed serial data from MAU 52 to packet data in parallel units. A portion of the parallel packet data produced by S-P converter 68 is temporarily stored within receive buffer 70. Receive circuit 62 also includes address detection circuitry (not shown) which detects an address assigned to NIU 30 within the packet data stored in receive buffer 72. If the portion of the packet data stored in receive buffer 72 includes an address assigned to NIU 30, the entire packet data is received and transferred to packet buffer 72. Receive control unit 64 then transfers the parallel packet data units to bus interface unit 42 via internal bus 44. Bus interface unit 42 stores the packet data within memory unit 40 via NIU bus 34, preferably using DMA. If the portion of the received packet data stored in receive buffer 72 does not include an address assigned to NIU 30, the packet data stored in receive buffer 70 and the remaining packet data received from MAU 52 are ignored.

Figure 6:
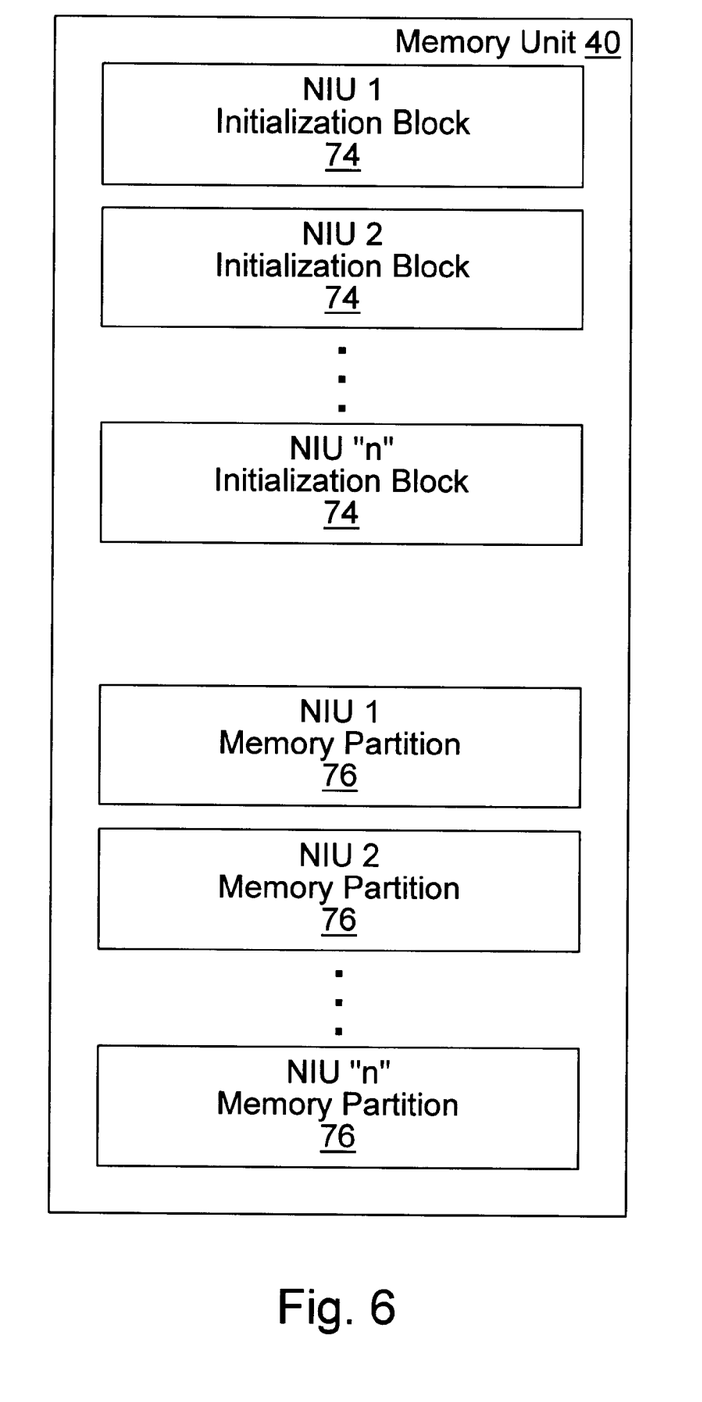
FIG. 6 is a block diagram of a preferred organization of the memory unit of the network router of FIG. 2, wherein the memory unit includes a portion of memory (i.e., a memory partition) for each communication network the network router is coupled to (i.e., for each NIU)
Figure 7:
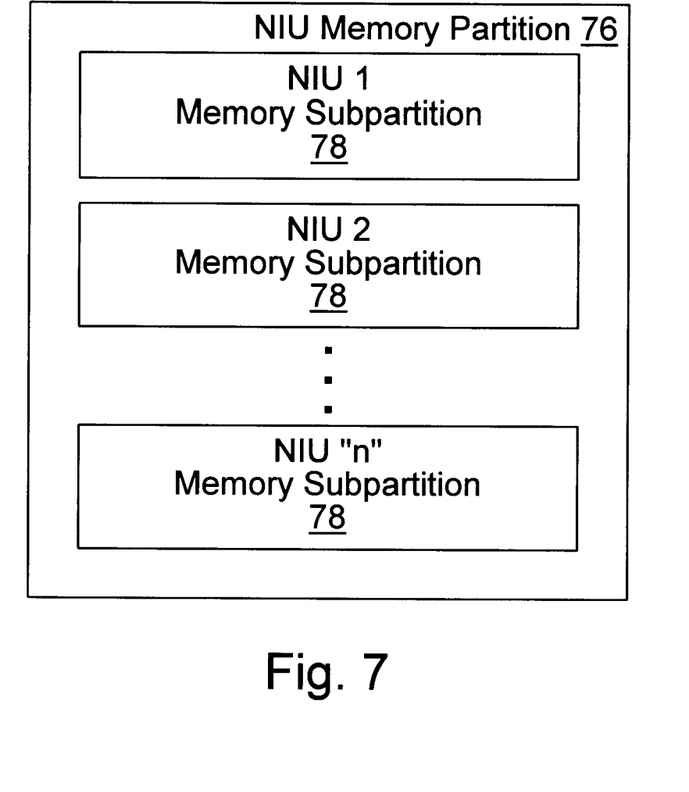
FIG. 7 is a block diagram of each memory partition of the memory unit of FIG. 6, wherein each memory partition includes a memory subpartition for each NIU.
Figure 8:
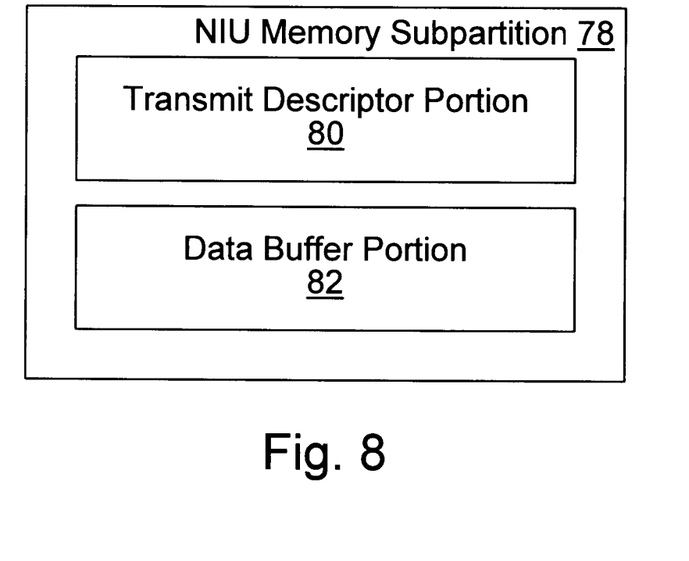
FIG. 8 is a block diagram of each memory subpartition of each memory partition of FIG. 7, wherein each memory subpartition includes a data buffer portion for storing data and a transmit descriptor portion for storing information about the data.

FIG. 6 is a block diagram of a preferred organization of memory unit 40. Memory unit 40 includes several blocks of contiguous memory locations. Memory unit 40 includes an initialization block 74 and an NIU memory partition 76 for each NIU 30. A given NIU 30 only stores information to the NIU memory partition 76 assigned to the NIU 30. FIG. 7 is a block diagram of each NIU memory partition 76 of memory unit 40 of FIG. 6. Each NIU memory partition 76 includes an NIU memory subpartition 78 for each NIU 30. FIG. 8 is a block diagram of an NIU memory subpartition 78 of each NIU memory partition 76 of FIG. 7. Each NIU memory subpartition 78 includes a transmit descriptor portion 80 and a data buffer portion 82. When a given NIU 30 receives packet data from network transmission medium 32, the receiving NIU 30 determines the destination NIU 30, and generates a transmit descriptor containing information about the packet data. As will be described in more detail below, the receiving NIU 30 stores the transmit descriptor and the packet data within the destination NIU memory subpartition 78 of the receiving NIU memory partition 76. Each NIU 30 must search a corresponding memory subpartition 78 within each memory partition 76 to determine the presence of packet data to be transmitted upon corresponding network transmission medium 32.

The initialization block 74 corresponding to a given NIU 30 includes NIU 30 operating information such as the physical address assigned to the NIU 30 and parameters determining the operation of NIU 30. The initialization block 74 thus also includes the addresses of (i.e., pointers to) all of the transmit descriptor portions 80 of the memory subpartitions 78 corresponding to the NIU 30 within memory partitions 76. Each initialization block 74 thus includes n addresses of corresponding transmit descriptor portions 80, where n is the number of NIUs 30 within network router 16.

Figure 9:
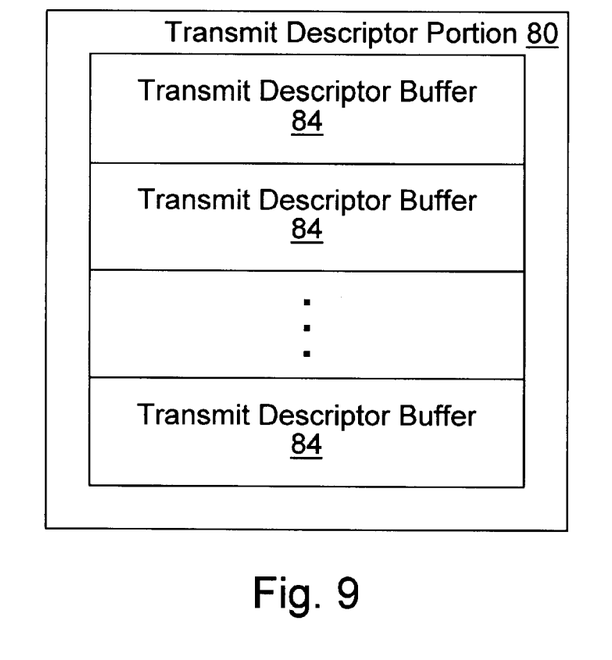
FIG. 9 is a block diagram of the transmit descriptor portion of the memory subpartition of FIG. 8, wherein the transmit descriptor portion includes multiple transmit descriptor buffers for storing transmit descriptors.
Figure 10:
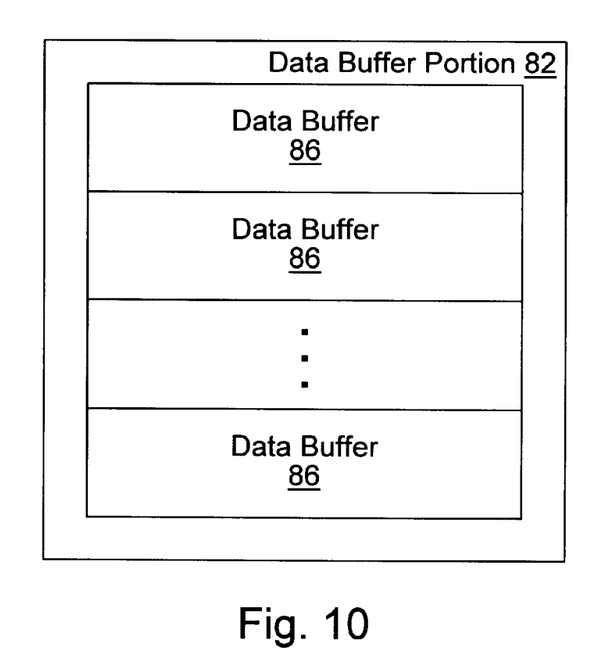
FIG. 10 is a block diagram of the data buffer portion of the memory subpartition of FIG. 8, wherein the data buffer portion includes multiple data buffers for storing data.

As described above, when a given NIU 30 receives packet data from network transmission medium 32, the receiving NIU 30 determines the destination NIU 30, and generates a transmit descriptor containing information about the packet data. The receive control unit 64 of the receiving NIU 30 uses the device address within the packet data and routing information stored within receive memory unit 66 to determine the correct destination NIU 30. CPU 36 of network router 16 is responsible for generation and maintenance of the routing information. CPU 36 disseminates the routing information (i.e., routing table) to each NIU 30 via NIU bus 34. CPU 36 also gathers error information from each NIU 30 for error reporting. The receiving NIU 30 stores the transmit descriptor within the transmit descriptor portion 80 of the destination NIU memory subpartition 78 of the receiving NIU memory partition 76. FIG. 9 is a block diagram of the transmit descriptor portion 80 of the NIU memory subpartition 78 of FIG. 8. Transmit descriptor portion 80 includes multiple transmit descriptor buffers 84 sized to accept a transmit descriptor. The format of the transmit descriptor will be described in more detail below. The receiving NIU 30 then stores the packet data within the data buffer portion 82 of the destination NIU memory subpartition 78 of the receiving NIU memory partition 76. FIG. 10 is a block diagram of the data buffer portion 82 of the NIU memory subpartition 78 of FIG. 8. Data buffer portion 82 includes multiple data buffers 86. Each data buffer 86 is preferably a selected size, and several data buffers may be linked together as required to store the packet data of a message.

There is preferably a transmit descriptor buffer 84 for each data buffer 86. In this case, a given transmit descriptor 84 describes the contents of the corresponding data buffer 86. In addition, each set of transmit descriptor buffers 84 within each transmit descriptor portion 80 of each NIU memory subpartition 78 is preferably managed as a circular queue wherein each transmit descriptor buffer 84 is used in sequence from a "first" transmit descriptor buffer 84 to a "last" transmit descriptor buffer 84. When the "last" transmit descriptor buffer 84 is used, the "first" transmit descriptor buffer 84 is reused.

Figure 11:
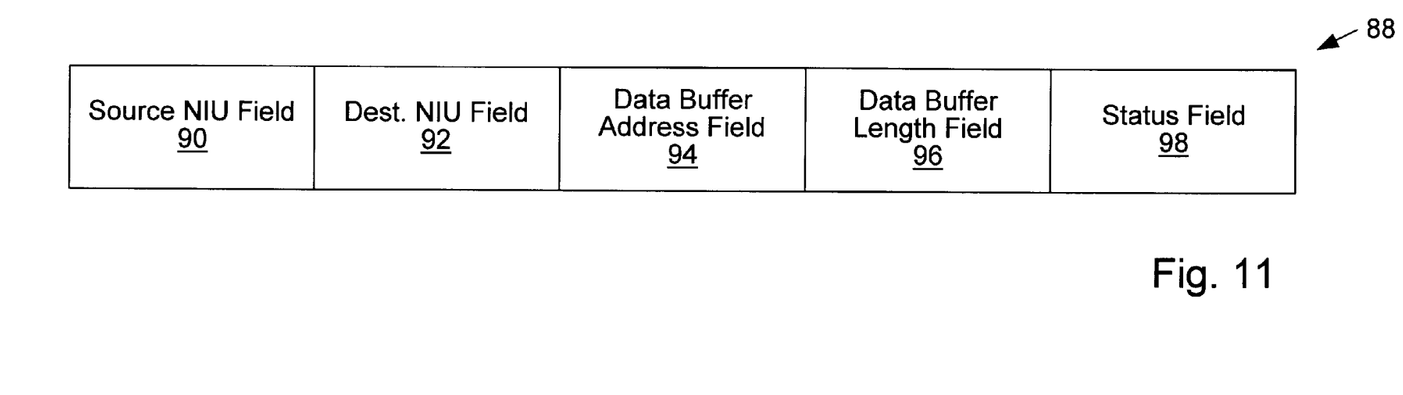
FIG. 11 is a block diagram of a preferred embodiment of a transmit descriptor stored within a transmit descriptor buffer of FIG. 9.

FIG. 11 is a block diagram of a preferred embodiment of a transmit descriptor 88. Transmit descriptor 88 includes a source NIU field 90, a destination NIU field 92, a data buffer address field 94, a data buffer length field 96, and a status field 98. Source NIU field 90 contains an entry which uniquely identifies the receiving NIU 30 (e.g., the physical address of the receiving NIU 30). Destination NIU field 92 contains an entry which uniquely identifies the destination NIU 30 (e.g., the physical address of the destination NIU 30). Data buffer address field 94 contains the address of the corresponding data buffer 86 containing packet data. Data buffer length field 96 contains the length of the packet data in fixed units (e.g., the length of the packet data in bytes). Status field 98 contains message status and error flags such as, for example, an "own" flag, an "error" flag, a "start-of-packet" flag, and an "end-of-packet" flag. The "own" flag of an available transmit descriptor is normally set to "1". The receiving NIU 30 clears the "own" flag (i.e., sets the "own" flag to "0") after transferring packet data to the corresponding data buffer 86 to indicate the packet data is ready for transmission by the destination NIU 30. The destination NIU 30 sets the "own" flag to "1" after emptying the data buffer 86. The "error" flag may be set by the receiving NIU 30 to indicate an error in the received packet data such as, for example, a framing error or a cyclic redundancy check (CRC) error. The "start-of-packet" flag may be set by the receiving NIU 30 to indicate that the corresponding data buffer 86 is only the first of several data buffers 86 required to contain the packet data of a single message. The "end-of-packet" flag may be set by the receiving NIU 30 used to indicate that the corresponding data buffer 86 is the last of several data buffers 86 required to contain the packet data of a single message.

As described above, each NIU 30 must search a corresponding memory subpartition 78 within each memory partition 76 of memory unit 40 to determine the presence of packet data to be transmitted. The receive control unit 64 of each NIU 30 preferably includes storage elements and logic circuitry to maintain the address of (i.e., a pointer to) the next available transmit descriptor buffer 84 for received packet data. The transmit control unit 56 of each NIU 30 preferably includes storage elements and logic circuitry to maintain n pointers to the next transmit descriptor buffers 84 within the corresponding memory subpartitions 78 which may hold packet data to be transmitted, where n is the number of NIUs 30. When an NIU 30 is not receiving packet data via the corresponding network transmission medium 32, the transmit control unit 56 of the NIU 30 periodically checks the next transmit descriptor buffer 84 of the corresponding memory subpartition 78 within each memory partition 76 to see if the "own" bit of the transmit descriptor in the next transmit descriptor buffer 84 has been set to "0" indicating the availability of packet data for transmission. If the "own" bit of a transmit descriptor is "0", the NIU 30 transfers the packet data within the corresponding data buffer to transmit buffer 58, sets the "own" bit of the transmit descriptor to "1", frames the packet data according to the selected protocol, and transmits the packet data upon network transmission medium 32.

It will be appreciated to those skilled in the art having the benefit of this disclosure that this invention is believed to be a network router for transferring data between a plurality of communication networks. The network router includes a partitioned memory for optimized data storage and retrieval. Furthermore, it is also to be understood that the form of the invention shown and described is to be taken as exemplary, presently preferred embodiments. Various modifications and changes may be made without departing from the spirit and scope of the invention as set forth in the claims. It is intended that the following claims be interpreted to embrace all such modifications and changes.

What is claimed is:

1. A network router for transferring data between a plurality of communication networks, comprising:
    a network interface unit (NIU) bus including a plurality of signal lines for conveying signals;
    a memory unit operably coupled to the NIU bus and configured to store data, wherein the memory unit includes a plurality of memory partitions, and wherein each memory partition corresponds to one of the plurality of communication networks;
    a plurality of network interface units (NIUs), wherein each NIU corresponds to one of the plurality of communication networks, and wherein each NIU is adapted for coupling to a network transmission medium of the corresponding communication network, and wherein each NIU is coupled to the NIU bus, and wherein each NIU is configured to receive data from the network transmission medium and to store the received data within the corresponding memory partition of the memory unit, and wherein each NIU is configured to periodically poll each of the plurality of memory partitions for the presence of data to be transmitted.

2. The network router as recited in claim 1, further comprising chip set logic coupled between the memory unit and the NIU bus, wherein the chip set logic arbitrates control of the NIU bus between the plurality of NIUs.

3. The network router as recited in claim 2, wherein the chip set logic is configured to control the storage and retrieval of data within the memory unit.

4. The network router as recited in claim 2, further comprising a central processing unit (CPU) coupled to the chip set logic, wherein the chip set logic functions as an interface between the CPU and the memory unit and between the CPU and the NIU bus, and wherein the CPU is configured to initiate the activities of each of the plurality of NIUs, to maintain and transfer data routing information to each of the plurality of NIUs, and to gather error information from each of the plurality of NIUs.

5. The network router as recited in claim 1, wherein the memory unit includes one or more semiconductor memory devices.

6. The network router as recited in claim 1, wherein each NIU comprises:
    an internal bus including a plurality of signal lines for conveying signals;
    a bus interface unit coupled to the NIU bus and to the internal bus, wherein the bus interface unit is configured to handle data transfers between the NIU and the memory unit;
    a transmit unit coupled to the internal bus, wherein the transmit unit is configured to retrieve data to be transmitted from at least one of the plurality of memory partitions of the memory unit, to encapsulate the data into one or more frames according to a selected network protocol, to convert the framed data to a serial data stream, and to provide the resulting first framed serial data stream;
    a medium attachment unit adapted for coupling to the network transmission medium, wherein the medium attachment unit is coupled to the transmit unit, and wherein the medium attachment unit is configured to receive the first framed serial data stream from the transmit unit and to transmit the first framed serial data stream upon the network transmission medium, and wherein the medium attachment unit is configured to receive a second framed serial data stream from the network transmission medium and to provide the second framed serial data stream;
    a receive unit coupled between the medium attachment unit and the internal bus, wherein the receive unit is configured to receive the second framed serial data stream from the medium attachment unit, to extract data from the framed serial data stream according to the selected network protocol, to convert the data to parallel form, and to store the data within the corresponding memory partition of the memory unit; and
    a control unit coupled to the internal bus and configured to initiate the activities of the bus interface unit, the transmit unit, and the receive unit, and to arbitrate control of the internal bus between the transmit unit and the receive unit.

7. The network router as recited in claim 1, wherein each memory partition of the memory unit includes a plurality of memory subpartitions, and wherein each memory subpartition corresponds to one of the plurality of NIUs.

8. The network router as recited in claim 7, wherein each memory subpartition includes a transmit descriptor portion for storing information about the data and a data buffer portion for storing the data.

9. The network router as recited in claim 8, wherein the transmit descriptor portion includes a plurality of transmit descriptor buffers, and wherein the data buffer portion includes a plurality of data buffers.

10. The network router as recited in claim 9, wherein each transmit descriptor buffer corresponds to one of the plurality of data buffers, and wherein each transmit descriptor is sized to contain a transmit descriptor, and wherein the transmit descriptor identifies the NIU which is to transmit the data and the address of the corresponding data buffer including the data.

11. The network router as recited in claim 10, wherein the transmit descriptor includes a source NIU field containing an entry which uniquely identifies the receiving NIU, a destination NIU field containing an entry which uniquely identifies the NIU to transmit the data, a data buffer address field containing the address of the corresponding data buffer containing the data, a data buffer length field containing the length of the packet data in fixed units, and a status field containing status and error information pertaining to the data.

12. A network router for transferring data between a plurality of communication networks, comprising:

a network interface unit (NIU) bus including a plurality of signal lines for conveying signals;

a memory unit configured to store data and instructions, wherein the memory unit includes a plurality of memory partitions, and wherein each memory partition corresponds to one of the plurality of communication networks;

a plurality of network interface units (NIUs), wherein each NIU corresponds to one of the plurality of communication networks, and wherein each NIU is coupled to the NIU bus, and wherein each NIU comprises:

an internal bus including a plurality of signal lines for conveying signals;

a bus interface unit coupled to the NIU bus and to the internal bus, wherein the bus interface unit is configured to handle data transfers between the NIU and the memory unit;

a transmit unit coupled to the internal bus, wherein the transmit unit is configured to retrieve data to be transmitted from at least one of the plurality of memory partitions of the memory unit, to encapsulate the data into one or more frames according to a selected network protocol, to convert the framed data to a serial data stream, and to provide the resulting first framed serial data stream;

a medium attachment unit adapted for coupling to a network transmission medium of the corresponding communication network, wherein the medium attachment unit is coupled to the transmit unit, and wherein the medium attachment unit is configured to receive the first framed serial data stream from the transmit unit and to transmit the first framed serial data stream upon the network transmission medium, and wherein the medium attachment unit is configured to receive a second framed serial data stream from the network transmission medium and to provide the second framed serial data stream;

a receive unit coupled between the medium attachment unit and the internal bus, wherein the receive unit is configured to receive the second framed serial data stream from the medium attachment unit, to extract data from the framed serial data stream according to the selected network protocol, to convert the data to parallel form, and to store the data within the corresponding memory partition of the memory unit; and a control unit coupled to the internal bus and configured to initiate the activities of the bus interface unit, the transmit unit, and the receive unit, and to arbitrate control of the internal bus between the transmit unit and the receive unit;

a central processing unit (CPU) configured to execute instructions, wherein the CPU initiates the activities of each of the plurality of NIUs; and chip set logic coupled to the CPU, the memory unit, and the NIU bus, wherein the chip set logic arbitrates access to the NIU bus between the plurality of NIUs, and wherein the chip set logic is configured to control the storage and retrieval of data within the memory unit, and wherein the chip set logic functions as an interface between the CPU and the memory unit and between the CPU and the NIU bus.

13. The network router as recited in claim 12, wherein each memory partition of the memory unit includes a plurality of memory subpartitions, and wherein each memory subpartition corresponds to one of the plurality of NIUs.

14. The network router as recited in claim 13, wherein the memory unit includes one or more semiconductor memory devices.

15. The network router as recited in claim 13, wherein each memory subpartition includes a transmit descriptor portion for storing information about the data and a data buffer portion for storing the data.

16. The network router as recited in claim 15, wherein the transmit descriptor portion includes a plurality of transmit descriptor buffers, and wherein the data buffer portion includes a plurality of data buffers.

17. The network router as recited in claim 16, wherein each transmit descriptor buffer corresponds to one of the plurality of data buffers, and wherein each transmit descriptor is sized to contain a transmit descriptor, and wherein the transmit descriptor identifies the NIU which is to transmit the data and the address of the corresponding data buffer including the data.

18. The network router as recited in claim 17, wherein the transmit descriptor includes a source NIU field containing an entry which uniquely identifies the receiving NIU, a destination NIU field containing an entry which uniquely identifies the NIU to transmit the data, a data buffer address field containing the address of the corresponding data buffer containing the data, a data buffer length field containing the length of the packet data in fixed units, and a status field containing status and error information pertaining to the data.

* * * * *